United States Patent [19]
Demers

[11] Patent Number: 5,243,873
[45] Date of Patent: Sep. 14, 1993

[54] TWO-AXIS MOTION MECHANISM

[75] Inventor: Robert E. Demers, Elk River, Minn.

[73] Assignee: Honeywell Inc., Minneapolis, Minn.

[21] Appl. No.: 23,497

[22] Filed: Feb. 26, 1993

Related U.S. Application Data

[63] Continuation-in-part of Ser. No. 824,632, Jan. 23, 1992, abandoned.

[51] Int. Cl.$^5$ .............................................. B25J 17/00
[52] U.S. Cl. .......................... 74/479 BW; 74/479 BJ; 901/28; 901/29
[58] Field of Search .............. 74/479; 901/28, 29, 901/27

[56] References Cited

U.S. PATENT DOCUMENTS

| | | | |
|---|---|---|---|
| 1,557,214 | 10/1925 | McClane | 74/471 XY |
| 2,379,778 | 7/1945 | Allen | 192/0.02 |
| 2,929,258 | 3/1960 | Mackway | 74/471 |
| 2,945,414 | 7/1960 | Blackstone | 74/479 |
| 3,095,754 | 7/1963 | Mayon et al. | 74/471 |
| 3,550,466 | 12/1970 | Ham | 74/471 |
| 4,073,201 | 2/1978 | Taylor et al. | 74/479 X |
| 4,628,765 | 12/1986 | Dien et al. | 74/479 X |
| 4,686,866 | 8/1987 | Rosheim | 74/479 |
| 4,723,460 | 2/1988 | Rosheim | 74/479 |
| 4,729,253 | 3/1988 | Rosheim | 74/479 |
| 4,748,867 | 6/1988 | Susnjara | 74/479 |
| 4,804,220 | 2/1989 | Rosheim | 74/479 |
| 4,878,393 | 11/1989 | Duta et al. | 74/479 |
| 5,036,724 | 8/1991 | Rosheim | 74/479 |
| 5,101,681 | 4/1992 | Shpigel | 74/479 |

Primary Examiner—Rodney H. Bonck
Assistant Examiner—Ryan W. Massey
Attorney, Agent, or Firm—Mark J. Gebhardt

[57] ABSTRACT

A two-axis motion mechanism with reduced backlash includes two-axis motion that is transferred between a moveable member and a first and second shaft positioned orthogonal to each other through three principle bearings. The first and second shaft are fixedly positioned so as to constrain motion except about a first and second axis therethrough, respectively. The second axis is substantially orthogonal to the first axis intersecting at the center of the mechanism. An outer ring, having the moveable member connected thereto and an inside ring nested therein lies in a plane transverse to the second shaft. Pins connect the outer ring with the inside ring. A case member is positioned about the outer ring with the first shaft mounted thereto. First duplex bearings couple the inside ring to a rod extending across the inside ring and connected to the second shaft at the center of the mechanism. The first duplex bearings allow rotation of the inside ring and the first axis. Second duplex bearings couple the inside ring to the pins to allow rotation between the inside ring and the outer ring. Third duplex bearings engage the case member and hold the outer ring allowing rotation of the outer ring and the moveable member extending therefrom about the second axis.

9 Claims, 5 Drawing Sheets

TWO-AXIS MOTION MECHANISM

This is a continuation-in-part of application Ser. No. 07/824,632, filed Jan. 23, 1992 and now abandoned.

FIELD OF THE INVENTION

The present invention relates to a two-axis motion mechanism. More particularly, the present invention relates to a two-axis motion mechanism with reduced backlash.

BACKGROUND OF THE INVENTION

In the fields of kinematics and mechanics, the solution to the problem of generating or sensing motion in a two-degree of freedom system with a mechanism, has been approached in a number of ways. One solution of the prior art is provided by a gimbal. An alternative system provided by the prior art is a pivotable member restrained by a system of orthogonal semi-circular sliding braces.

FIG. 1 shows a gimbal 10 of the prior art in a two-axis drive system. The gimbal 10 includes a base 12 which may be fixed to ground 11. The base 12 includes a swivel 17 with a bracket 14 attached thereto. The bracket 14, accomplishes rotary motion about the swivel 17 relative to the base 12. Attached to the bracket 14 is a second swivel 19 with an output member 22 attached to a shaft 20 in axial alignment with the swivel 19. In the gimbal 10 of the prior art, a first motor 16 is located on the base 12 to generate angular motion of the bracket 14 with respect to the base 12. A second motor 18 is positioned to provide motion about an axis generally orthogonal to the first motor 16. As the motors 18 and 16 are driven, the output member 22 responds accordingly.

The principle deficiency of the gimbal 10 stems from the need to locate the second motor 18 on the rotating bracket 14. Thus, for the prior art gimbal 10 to generate motion for the output member 22, not only is a motor 16 required on the base 12 but also a motor 18 must be mounted on the bracket 14.

To communicate data from the second motor 18 to a controller attached to ground 11 may require difficult and complex connections. Such connections may interfere with the operation of the gimbal 10. Difficult connections may also contribute to reduced reliability of the gimbal based, two-axis drive mechanism. The weight of the gimbal 10 is also increased by the weight of motor 18 making it less adaptable to various kinematic drive tasks.

FIG. 2 shows a method of sensing two-axis motion of a pivoting member 24. The mechanism of FIG. 2 provides a central pivoting member 24 which is restrained by a first semi-circular sliding brace 30 and a second semi-circular sliding brace 32. First semi-circular sliding brace 30 is attached to ground 11 by pivots 38 and 39 which allows the brace 30 to rotate about a first axis 40. A second semi-circular sliding brace 32 is attached to ground 11 by pivots 42 and 44 which allow the brace 32 to rotate about a second axis 46. The second axis 46 is orthogonal to the first axis 40 to provide sensor outputs in two axes. The member 24 is located within the intersection of the two semi-circular sliding braces 30 and 32. The sliding braces 30 and 32 work in a radial fashion such that the member 24 is free to move within the sliding braces 30 and 32 while being constrained by the sliding braces 30 and 32 and bearing 36. The axial sensors 41 and 43 for this configuration are attached to shafts 28 and 26 along axis 46 and 40, respectively. The shafts 28 and 26 are then connected to sliding braces 32 and 30, respectively. The pivoting member 24 is attached to a base 34 at pivot 36. All pivoting member 24 motion relative to the base 34 is sensed by sensors 41 and 43 as shafts 28 and 26 turn, respectively.

The principle deficiency of the sliding brace system 15 stems from the tendency of the sliding braces 30 and 32 to bind and/or deform and cause backlash thus reducing the accuracy and repeatability of the device. The sliding brace method does provide a way to hold the two-axial sensors 41 and 43 stationary which creates an advantage over the gimbal 10 previously described.

Improvement over the sliding brace method are described in U.S. Pat. No. 4,723,460 to Rosheim and in U.S. Pat. No. 2,929,258 to Mackway. In both cases, sliding braces have been replaced with an inner and outer rotary bearing ring. The outer race of the inner bearing ring is coupled to the inner race of the outer bearing ring, thereby allowing rotation between the two bearing rings. However, the mechanisms described in Rosheim and Mackway rely on press fits for assembly. This makes them less suitable for transmitting large forces and resisting abuse. Rosheim and Mackway also both use a single rotary bearing for transmitting rotation between a pivoting member and shafts for imparting motion thereto or sensing motion thereof. The inner race of the single rotary bearing is twisted out of the plane of the outer race, increasing wear and subsequently producing backlash; the backlash increasing as the bearings wear.

In summary, the prior art suffers from a number of drawbacks. The gimbal system of FIG. 1 suffers in that the second motor 18 needs to be incorporated in the moving bracket 14. This adds substantially to the weight of the mechanism and thus the cost and difficulty of manufacture. The mechanism of FIG. 2 includes the problems of difficulty of mechanism repeatability, difficulty of construction because the rails need to be fairly small in relation to the pivoting member 24 to accomplish quick motion and the mechanism has a degree of backlash because the brackets 30 and 32 tend to bind and/or deform. In addition, the mechanisms of Rosheim and Mackway make use of press fits which simplify assembly, but which are a failure point along with the single rotary bearings used in the bearings rings which are subject to ever increasing backlash, especially under large loads.

Thus, it is a motive of the present invention to provide a two-axis motion mechanism that provides a robust, backlash reduced means of generating or sensing two-axis motion while keeping the position of either the drive motors or sensors stationary, depending upon whether the mechanism is used as a drive or sensor mechanism.

SUMMARY OF THE INVENTION

The present invention provides a two-axis motion mechanism for use in generating or sensing motion in two-axes about a center point. The two-axis motion mechanism provides reduced backlash while maintaining each axis's motor, or sensor, fixed in relation to ground. The mechanism is capable of sustaining large loads without failing or operating at a level of reduced performance.

The two-axis motion mechanism of the present invention includes a moveable member and a first shaft having a first and second end. The first end of the first shaft is fixedly positioned so as to constrain motion of the first shaft in all degrees of freedom except about a first axis therethrough. A second shaft having a first and second end is fixedly positioned so as to constrain motion of the second shaft in all degrees of freedom except about second axis therethrough. The second axis is substantially orthogonal to the first axis and the two axes intersect at substantially a center of the motion mechanism. The mechanism further includes an outside ring having a center substantially the same as the center of the motion mechanism and aligned in a plane transverse to the second shaft and the second axis therethrough. The moveable member is connected to and extends from the outside ring. A inside ring is nested within the outside ring in the plane transverse to the second drive shaft and the second axis therethrough. Pins connect the outside ring to the inside ring with the pins being rigidly connected to the outside ring. A case member is positioned about the outer ring with the second end of the first shaft mounted thereto. First duplex bearings couple the inside ring to a rod extending across the inside ring which is substantially orthogonal to the pins. The rod is connected to the second end of the second shaft at substantially the center of the drive mechanism. The first duplex bearings allow rotation of the inside ring about the rod and about the first axis. Second duplex bearings couple the inside ring to the pins to allow rotation between the inside ring and the outside ring. A third duplex set of bearings engage the case member and hold the outside ring. The third duplex set of bearings allow for rotation of the outer ring and the member extending therefrom about the second shaft and the second axis therethrough.

In an additional embodiment of the invention, the pins of the mechanism include a first and second pin, each orthogonal to the rod and each having a first and second end. The first end of the first pin is rigidly connected to the outer ring and the second end of the first pin is rotationally coupled to the inside ring by the second duplex bearings. The first end of the second pin is rotationally coupled to the inside ring by the second duplex bearings and the second end of the second pin is rigidly connected to the outer ring.

In yet another embodiment of the invention, the first, second and third duplex bearings each include first and second bearings which are preloaded against one another.

DESCRIPTION OF THE PREFERRED EMBODIMENT

Figure 1:
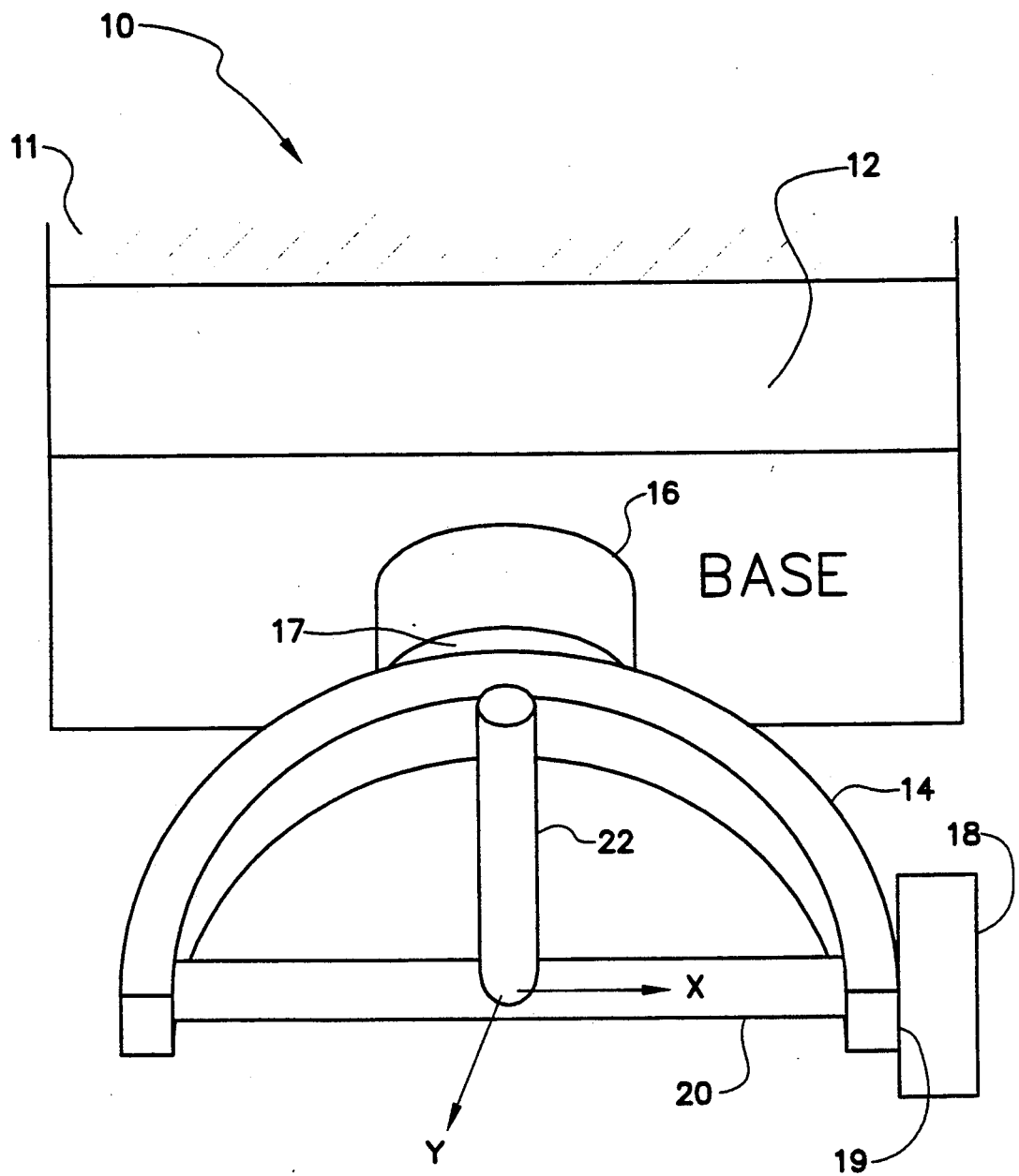
FIG. 1 shows a gimbal based two-axis drive mechanism of the prior art.
Figure 2:
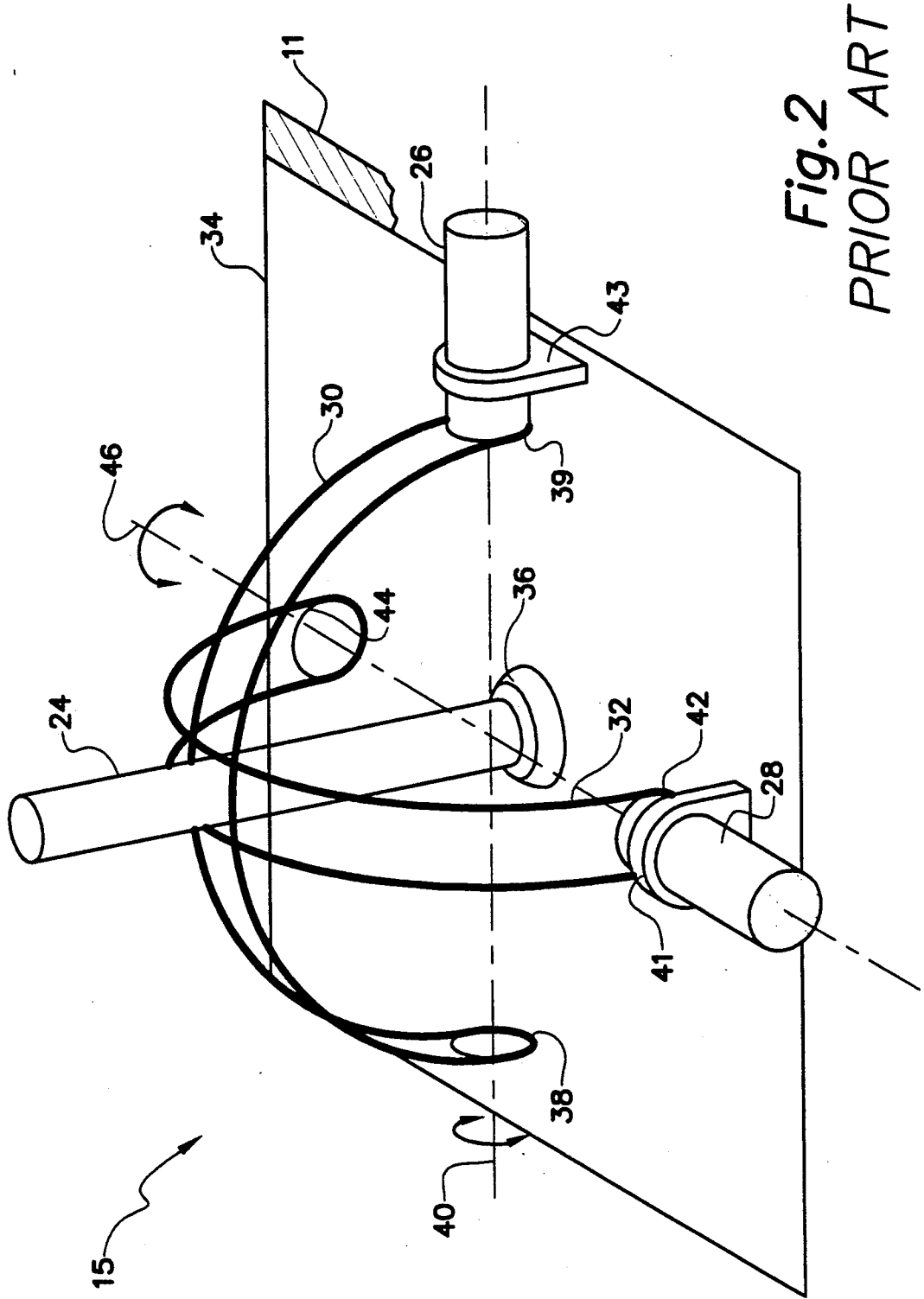
FIG. 2 shows a sliding brace two-axis sensor mechanism of the prior art.
Figure 3:
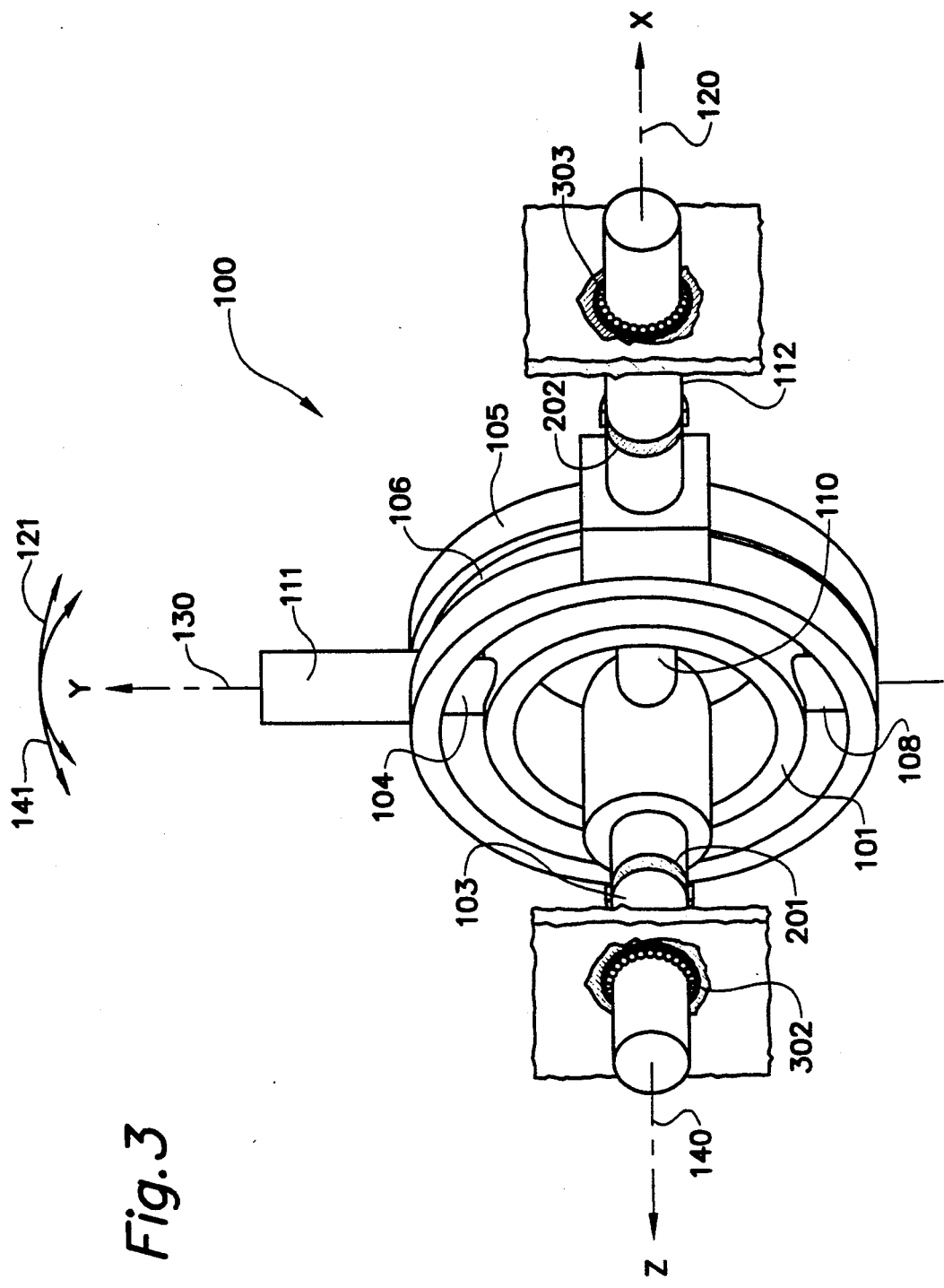
FIG. 3 shows an isometric diagram of a two-axis motion mechanism in accordance with the present invention.
Figure 4:
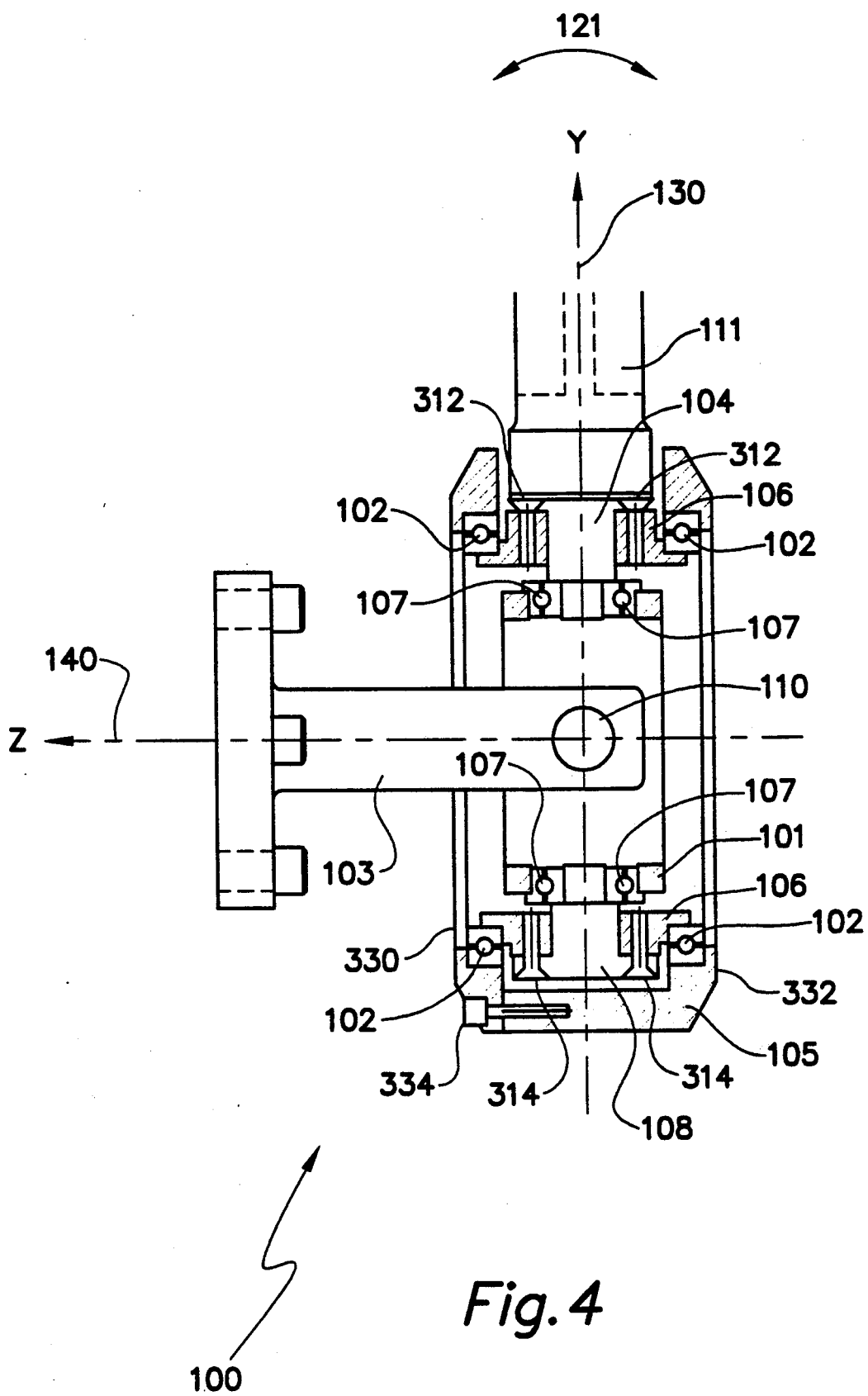
FIG. 4 shows a two-dimensional cut-away view of the mechanism shown in FIG. 3.
Figure 5:
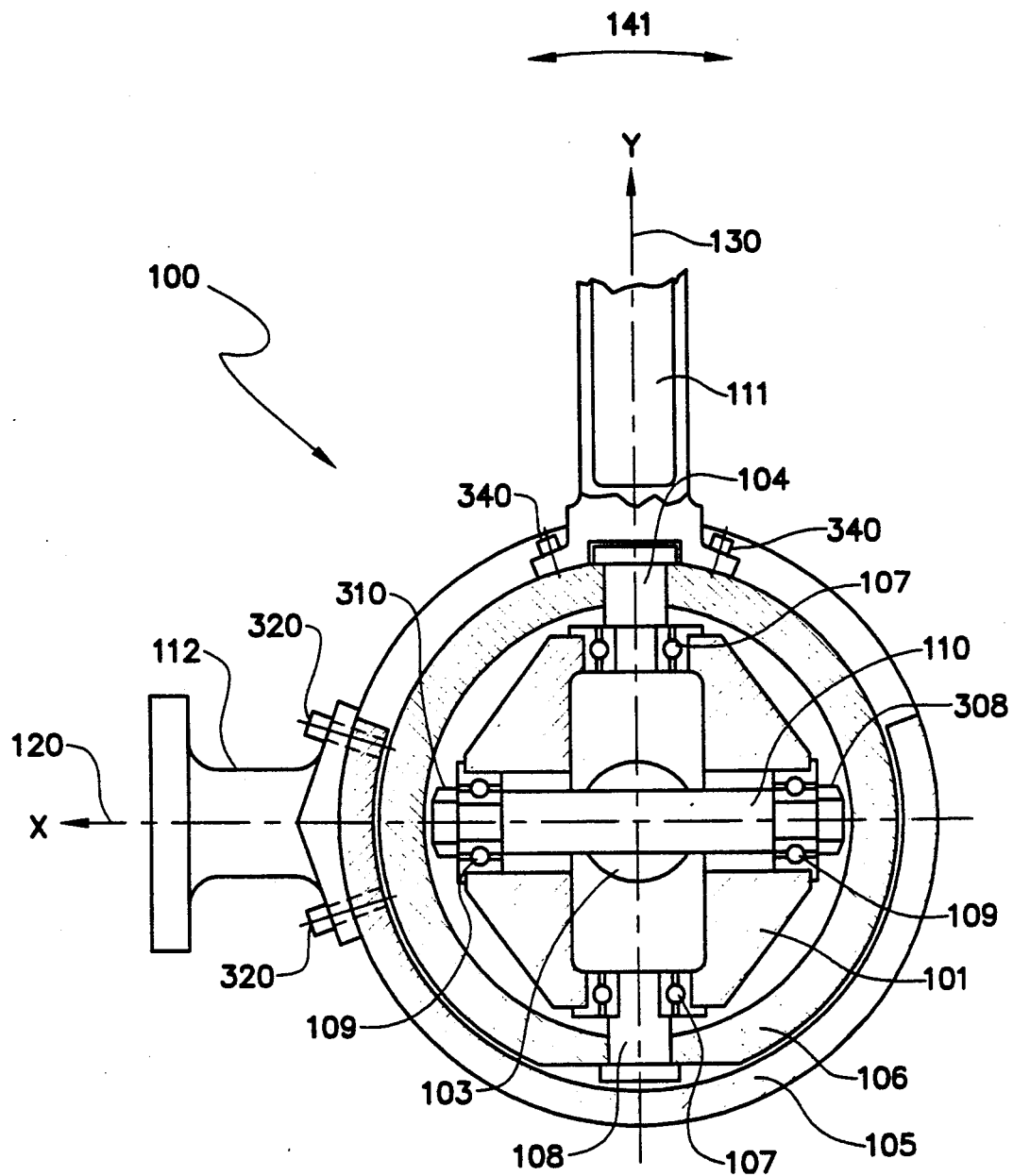
FIG. 5 shows a two-dimensional cut-away view of the invention shown in FIG. 3 orthogonal to the view in FIG. 4.

Referring to FIGS. 3, 4 and 5, a two-axis motion mechanism 100 in accordance with the present invention shall be described. The mechanism 100 is comprised of two nested rings, an outer ring 106 and an inner ring 101. The two rings are centered at a common point at which Z axis 140, Y axis 130, and X axis 120 intersect. Shaft 103 is perpendicular to a plane containing the nested outer ring 106 and inner ring 101. The shaft 103 is fixed on a rod 110 set crosswise in the inside ring 101. Shaft 103 is constrained in all degrees of freedom except for rotation about the axis 140, which is allowed by supporting the end of the shaft 103 in a set of bearings 302. The ends of the rod 110 are set in precision ball bearings 109, FIG. 5. The ball bearings 109 allow the inside ring 101 to rotate on the rod 110. The bearings 109 are selected by size, dependent on the load expected on rod 110. The smallest possible commercially available bearings capable of handling such a load are selected. Bearings 109 are preloaded against each other to reduce backlash in this joint. The degree of preloading is accomplished by choosing a predetermined length for rod 110 such that when nuts 308, 310 are tightened on threaded ends of rod 110, the duplex set of bearings 109 are preloaded against one another with a desired preloaded force. However, the amount of preloading must be balanced with the friction created due to this preloading force. In other words, a tradeoff between reduced backlash and friction must be considered.

Perpendicular to rod 110, are pins 104 and 108 which connect the inside ring 101 to the outside ring 106. The pins 104, 108 each have a first end which is fixed to the outside ring 106 by screws 312 and 314, respectively. Duplex precision ball bearings 107, set in the inside ring 101 have an inner race which engages the pins 104, 108 allowing for rotation between the inside ring 101 and the outside ring 106. The duplex set of bearings 107 are preloaded against each other by selecting pins 104 and 108 of sufficient length to achieve preloading when screws 312 and 314 are tightened, respectively. The degree of preload force is selected to reduce backlash with the tradeoff of friction being considered.

The output or movable member 111 is attached to the outside ring 106 by screws 340, FIG. 5. The outside ring 106 is held between a preloaded duplex set of large diameter bearings 102, preferably thin section bearings. The bearings 102 are preloaded against each other by means of a case member 105 surrounding and engaging the outer race of bearings 102; the inner race of bearings 102 engaging the outer ring 106. The preloading of bearings 102 is accomplished by means of case member 105. The case member 105 includes case portions 330 and 332 which are coupled by screws 334, FIG. 4. Because of the cutaway view of FIG. 4, only one screw is apparent. However, screws 334 exist around the periphery of the portion 330 about the outer ring 106. The case 105 which surrounds the outer races of the large diameter bearings 102, provides support for the other elements assembled, applies the pre-load for reduced backlash, and also supplies a mounting point for the second shaft 112, via screws 320. The second shaft 112 is constrained in all degrees of freedom except for rotation about the axis 120. The shaft 112 is allowed to rotate only about the X-axis by supporting the end of the shaft 112 in a set of bearings 303.

The principle function of the mechanism 100 is to control the driving or sensing of moveable member 111 motion such that axial displacement of the moveable member 111 about the axis 140 is accurately and repeatedly sensed or driven and that axial displacement of the moveable member 111 about the axis 120 is accurately and repeatedly sensed or driven. In order to allow the mechanism 100 to function as a drive mechanism, drive motors 201 and 202 are positioned with respect to shafts 103 and 112, respectively; the shafts being set in sets of bearings to allow rotation along the respective axis. On the other hand, to allow the mechanism 100 to function as a sensing mechanism, sensing elements are positioned in place of the drive motors to sense rotation of shafts 103 and 112, respectively, along the axes 140 and 120. Such sensing elements and drive motors are commonly known to one skilled in the art.

For brevity, the invention shall further be described with reference to the mechanism 100 as a drive mechanism wherein shafts 103 and 112 are rotated by drive motors 201 and 202 to accomplish displacement of the moveable member 111. One skilled in the art should clearly recognize the applicability of the mechanism 100 as a sensing mechanism in lieu of the drive mechanism description.

Rotation of the shaft 112 by drive motor 202 is transferred to the case 105 and then to the outside ring 106 via the duplex set of large diameter bearings 102. The moveable member 111, fixed to the outside ring 106 via hardware 340, rotates with the outside ring 106. Using the duplex set of bearings 102 increases the load capacity, reduces wear, and allows the joint to be preloaded. The torque load from the rotating shaft 112 is split into a force couple, with half the load going to each bearing 102. The bearings 102 are subjected to purely radial loads where they have the most carrying capacity. This reduces bearing wear. The case 105 preloads the bearings 102 against each other. This allows slop in the bearings to be taken out in a controllable fashion.

The rotation of the moveable member 111 precisely matches the rotation of the shaft 112 due to this preloading. With the moveable member 111 being fixed to the outside ring 106 and the outside ring 106 being fixed to the inner races of the bearings 102, the outside ring 106 is free to rotate about the axis of the bearings 102. While the moveable member 111 is constrained to rotate only about the X axis 120 with rotation of shaft 112, the rotation of moveable member 111 rotation about the Z axis 140 is totally independent.

Rotation of the shaft 103 about Z axis 140 is transferred to the rod 110 and then to the inside ring 101 via the bearings 109. Rotation of the inside ring 101 is transferred to the outside ring 106 and hence the moveable member 111, via the pins 108, 104 and the bearings 107. With regard to the transfer of rotation from shaft 103 to rod 110, the input torque of shaft 103 is split into a force couple acting on the ends of rod 110. This reduces the load that each of the duplex bearings 109 must carry to half the original and also converts it to a purely radial load against which the bearings have the most strength. Preloading the bearings 109 against each other removes slop in the joint and provides for a precise matching of rotation between the input shaft 103 and the inside ring 101.

With regard to the transfer of rotation from the inside ring 101 to moveable member 111, torque on the inside ring 101 is transferred to the outside ring 106 and thus the moveable member 111 via a force couple on the pins 108, 104 and the bearings 107. As before, using a duplex set of bearings 107 allows the load to be divided and redirected into purely radial forces on the bearings, reducing wear and increasing load capacity.

The rod 110 and pins 108, 104 constrain the rotation of the outside ring 106 and the moveable member 111 extending therefrom to precisely match the rotation of the shaft 103 about the Z axis 140. The bearings 109, on the other hand, allow the moveable member 111 to rotate independently about the X axis 120.

In order for the moveable member 111 to independently rotate about both the X axis 120 and the Z axis 140, the inside ring 101 and the outside ring 106 must freely rotate with respect to each other about the pins 108, 104. The duplex set of bearings 107 allow for such rotation with a minimum of backlash. When both shafts 103 and 112 are driven, the motion of the moveable member 111 is in a logical hemisphere generally defined by the arrows 141 and 121. The relative motion of the rod bearings 109, the pin bearings 107, and the outside ring bearings 102 provides the means by which the moveable member 111 can move in an arbitrary direction around the center of the mechanism 100. Thus, the degree of freedom afforded by the three principle bearings of the apparatus provide a mechanism that is free to drive a moveable member around two axes.

The three principle duplex sets of bearings may be implemented with bushings or sliding bearings, ball bearings, rolling bearings, and/or any other bearing type which will allow the relative motion between the elements of the motion mechanism as described herein. The present invention is in no manner limited to those specifically listed, but also includes those which perform the functions of the duplex bearings as described and which fall within the scope of the invention.

Those in the art will recognize that only preferred embodiments of the present invention have been disclosed herein, other advantages may be found and realized and various modifications may be suggested by those versed in the art, and it should be understood that the embodiment shown here may be altered and modified without departing from the true spirit and scope of the invention as defined in the accompanying claims.

What is claimed is:

1. A two-axis motion mechanism, comprising:
   a moveable member;
   a first shaft having a first and second end, said first end of said first shaft fixedly positioned so as to constrain motion of the first shaft in all degrees of freedom except about a first axis therethrough;
   a second shaft having a first and second end, said first end of said second shaft fixedly positioned so as to constrain motion of the second shaft in all degrees of freedom except about a second axis therethrough, said second axis substantially orthogonal to said first axis and intersecting at substantially a center of the motion mechanism;
   an outer ring having a center substantially the same as the center of the motion mechanism and lying in a plane transverse to said second shaft and said second axis therethrough, said moveable member connected to and extending from said outer ring;
   an inside ring nested within said outer ring in the plane transverse to said second shaft and second axis therethrough;
   pinning means for connecting said outer ring to said second ring, said pinning means rigidly connected to said outside ring;
   a case member positioned about said outer ring, said second end of said first shaft mounted to said case member;
   first duplex bearings for coupling said inside ring to a rod extending across said inside ring and orthogonal to said pinning means, said rod connected to said second end of said second shaft at substantially the center of the motion mechanism, said first duplex bearings for allowing rotation of said inside ring and about said rod and about said first axis;

second duplex bearings for coupling said inside ring to said pinning means to allow rotation between said inside ring and said outer ring; and third duplex bearings engaging said case member for holding said outer ring, said third duplex bearings for allowing rotation of said outer ring and said moveable member extending therefrom about said second shaft and said second axis therethrough.

2. A mechanism according to claim 1, wherein each of said first, second and third duplex bearings include first and second bearings which are preloaded against one another.

3. A mechanism according to claim 2, wherein said rod includes a first and second threaded end sized for receiving a first and second nut thereon to preload said first duplex bearings.

4. A mechanism according to claim 2, wherein said pinning means includes hardware means for fixedly attaching said pinning means to said outer ring and said second duplex bearings.

5. A mechanism according to claim 2, wherein said case member includes a first case portion, a second case portion, and means for attaching said first case portion to said second case portion and for preloading said third duplex bearings.

6. A mechanism according to claim 1, wherein said pinning means comprises first and second pin, each pin being orthogonal to said rod and having a first and second end, said first end of said first pin rigidly connected to said outer ring, said second end of said first pin being rotationally coupled to said inner ring by said second duplex bearings, said first end of said second pin being rotationally coupled to said inner ring by said second duplex bearings and said second end of said second pin being rigidly connected to said outer ring.

7. A mechanism according to claim 1, wherein said third duplex bearings are a duplex set of large diameter thin section bearings.

8. A mechanism according to claim 1, further comprising first drive means coupled to said first end of said first shaft for rotating said first shaft and second drive means coupled to said first end of said second shaft for rotating said second shaft.

9. Apparatus according to claim 1, further comprising first sensor means coupled to said first end of said first shaft for sensing rotation of said first shaft and second sensor means coupled to said first end of said second shaft for sensing rotation of said second shaft.

* * * * *